US012801149B2

(12) United States Patent
Karrer et al.

(10) Patent No.: US 12,801,149 B2
(45) Date of Patent: Nov. 17, 2026

(54) METHOD AND SYSTEM FOR GENERATING SCAN DATA OF AN AREA OF INTEREST

(71) Applicant: HEXAGON INNOVATION HUB GMBH, Heerbrugg (CH)

(72) Inventors: Marco Karrer, Laufen (CH); Andrej Adzic, Zürich (CH); Thomas Ziegler, Zürich (CH); Jakub Kolecki, Balgach (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 143 days.

(21) Appl. No.: 18/434,579

(22) Filed: Feb. 6, 2024

(65) Prior Publication Data

US 2024/0264606 A1 Aug. 8, 2024

(30) Foreign Application Priority Data

Feb. 6, 2023 (EP) .................................... 23155195

(51) Int. Cl.
*G05D 1/246* (2024.01)
*G01C 21/00* (2006.01)
(Continued)

(52) U.S. Cl.
CPC ........... *G05D 1/2465* (2024.01); *G01C 21/12* (2013.01); *G01C 21/3841* (2020.08);
(Continued)

(58) Field of Classification Search
CPC ............. G05D 1/2465; G05D 2111/10; G05D 2111/30; G05D 2111/52; G01C 21/12; G01C 21/3841; G01C 21/3856
See application file for complete search history.

(56) References Cited

U.S. PATENT DOCUMENTS

2007/0156286 A1* 7/2007 Yamauchi .............. G05D 1/024
700/245
2012/0014684 A1* 1/2012 D'Souza ................ H04N 23/62
396/263

(Continued)

FOREIGN PATENT DOCUMENTS

EP 3 779 357 A1 2/2021
WO 2020/088739 A1 5/2020

OTHER PUBLICATIONS

Flyability, Flyability launches the Elios 3, an indoor LiDAR drone for Industry 4.0, available at https://www.flyability.com/news/elios-3-launch (Year: 2022).*

(Continued)

*Primary Examiner* — Justin R. Blaufeld
(74) *Attorney, Agent, or Firm* — Maschoff Brennan

(57) ABSTRACT

A system and a method for generating three-dimensional scan data of areas of interest, the method comprising a user defining the areas of interest using a mobile device in the environment, and a scanning device performing a scanning procedure at each defined area of interest to generate the scan data of the respective area of interest, wherein defining the areas of interest comprises, for each area of interest, generating identification data, wherein generating the identification data at least comprises generating image data of the respective area of interest, and the scanning procedure at each defined area of interest is performed by a mobile robot comprising the scanning device and being configured for autonomously performing a scan of a surrounding area using the scanning device, the mobile robot having a SLAM functionality for simultaneous localization and mapping and being configured to autonomously move through the environment using the SLAM functionality.

20 Claims, 4 Drawing Sheets

(51) Int. Cl.
*G01C 21/12* (2006.01)
*G05D 111/10* (2024.01)
*G05D 111/30* (2024.01)
*G05D 111/50* (2024.01)

(52) U.S. Cl.
CPC ...... *G01C 21/3856* (2020.08); *G05D 2111/10* (2024.01); *G05D 2111/30* (2024.01); *G05D 2111/52* (2024.01)

(56) References Cited

U.S. PATENT DOCUMENTS

| | | | | |
|---|---|---|---|---|
| 2014/0111332 | A1* | 4/2014 | Przybylko | G06Q 10/00 340/573.6 |
| 2019/0206044 | A1* | 7/2019 | Marra | G01C 11/00 |
| 2021/0133480 | A1* | 5/2021 | Rus | G06V 10/454 |
| 2022/0199253 | A1 | 6/2022 | Wang et al. | |
| 2025/0304295 | A1* | 10/2025 | Jamolli | B64U 20/87 |

OTHER PUBLICATIONS

Kelly Steich et al., Tree Cavity Inspection Using Aerial Robots, 2016 IEEE/RSJ International Conference on Intelligent Robots and Systems (IROS) 4856-4862 (2016), available at https://doi.org/10.1109/IROS.2016.7759713 (Year: 2016).*

Matthias Nieuwenhuisen et al., ChimneySpector: Autonomous MAV-based indoor chimney inspection employing 3D laser localization and textured surface reconstruction, 2017 International Conference on Unmanned Aircraft Systems (ICUAS) 278-285 (2017), available at https://doi.org/10.1109/ICUAS.2017.7991427 (Year: 2017).*

Lynen, Simon, et al. "A robust and modular multi-sensor fusion approach applied to MAV navigation." 2013 IEEE/RSJ international conference on intelligent robots and systems (Year: 2013).*

Fehr, M. et al., "Visual-Inertial Teach and Repeat for Aerial Inspection," IEEE/RSJ International Conference on Intelligent Robots and Systems (IROS) (Year: 2018).*

Bircher, A. et al., "Receding Horizon "Next-Best-View" Planner for 3D Exploration," IEEE International Conference on Robotics and Automation (ICRA), pp. 1462-1468 (2016).

Cieslewski, T. et al., "Rapid Exploration with Multi-Rotors: A Frontier Selection Method for High Speed Flight," IEEE/RSJ International Conference on Intelligent Robots and Systems (IROS), (2017).

Fehr, M. et al., "Visual-Inertial Teach and Repeat for Aerial Inspection," IEEE/RSJ International Conference on Intelligent Robots and Systems (IROS), (2018).

Bartolomei, L. et al., "Multi-robot Coordination with Agent-Server Architecture for Autonomous Navigation in Partially Unknown Environments," IEEE/RSJ International Conference on Intelligent Robots and Systems (IROS), pp. 1516-1522 (2020).

Kompis, Y. et al., "Informed Sampling Exploration Path Planner for 3D Reconstruction of Large Scenes," IEEE Robotics and Automation Letters, vol. 6, Issue 4, pp. 7893-7900 (Oct. 2021).

Schmid, L. et al., "Fast and Compute-efficient Sampling-based Local Exploration Planning via Distribution Learning," IEEE Robotics and Automation Letters, vol. 7, Issue 3, pp. 7810-7817 (Jul. 2022).

Extended European Search Report dated Jul. 27, 2023 as received in Application No. 23155195.3.

* cited by examiner

METHOD AND SYSTEM FOR GENERATING SCAN DATA OF AN AREA OF INTEREST

BACKGROUND

The present disclosure pertains to a method and system for generating scan data of an area of interest. More specifically, generating the scan data comprises a robot autonomously scanning an area of interest, or more particularly several areas of interest, in a larger scene, thereby avoiding scanning of "uninteresting" parts of the scene or even the whole scene. Using human input, the areas of interest can be defined in an efficient and intuitive manner. The robot may autonomously travel to and between the defined areas of interest. Optionally, the robot may use path information from the user to support the autonomous navigation to and between points of interest.

The disclosure aims at minimizing human effort to scan regions of interest while also minimizing the time needed by the robot to acquire the data.

EP 3 779 357 A1 discloses a method for surveying an environment by a movable surveying instrument in its environment along a substantially random trajectory, with a progressional capturing of 2D images by at least one camera at the surveying instrument and applying a visual simultaneous location and mapping algorithm (VSLAM) or a visual inertial simultaneous location and mapping algorithm (VIS-LAM) with a progressional deriving of a sparse evolving point cloud of at least part of the environment, and a progressional deriving of a trajectory of movement.

It would be desirable to allow a user to have areas of interest in an environment scanned without having to carry the scanner through the environment. Also, it would be desirable that the user does not have to wait at the area of interest until the scan has been performed.

WO 2020/088739 A1 discloses several systems and methods for automated facility surveillance using robots having sensors including laser scanners and being configured for autonomously moving through an environment. Autonomous exploration of areas of interest by robots is generally known in the art. Numerous aspects of this field are disclosed, e.g., in: Kompis et al., 'Informed sampling exploration path planner for 3d reconstruction of large scenes', IEEE RA-L 2021; Schmid et al., 'Fast and Compute-efficient Sampling-based Local Exploration Planning via Distributed Learning', ArXiv 2022; Bircher et al., 'Receding Horizon "Next-Best-View" Planner for 3D Exploration', IEEE ICRA 2016; and Cieslewski et al., 'Rapid exploration with multi-rotors: A frontier selection method for high speed flight', IEEE IROS 2017.

However, these methods are focused on complete exploration of an area and assign every part of the scene the same importance. Consequently, a large amount of time is potentially spent on exploring areas which might be of no particular interest to a user.

Other approaches follow a "teach-and-repeat" scheme, for instance Fehr et al., 'Visual-Inertial Teach and Repeat for Aerial Inspection', IEEE ICRA-Workshop 2018. Other approaches include a human in the loop to select interest points (so-called waypoints) while leaving the robot to autonomously find a way to reach these points. For instance such an approach is disclosed by Bartolomei et al., 'Multi-robot coordination with agent-server architecture for autonomous navigation in partially unknown environments', IEEE IROS 2020. However, such a representation requires to know the waypoints in a global reference frame, hence, some way of establishing this reference frame is required. In a GPS-denied area, such as interiors of buildings, this requires a localization algorithm and a map to localize the robot in the environment.

SUMMARY

It would be desirable to use an autonomous robot to carry out the scanning of the area of interest without the need of further user interaction after the definition of the areas of interest. It would also be desirable that the robot only scans the areas of interest.

It is therefore an object of the present disclosure to provide an improved method and system for generating 3D scan data of one or more areas of interest in an environment.

It is a further object to provide such a method and system that minimize the human effort, particularly that avoid the necessity for a human to move a scanner through the environment or to set-up a scanner at the one or more areas of interest.

It is a further object to provide such a method and system that minimize the time scanning the areas of interest, particularly to minimize the time for a mobile robot to identify user-defined areas of interest and to travel through the environment towards the areas of interest.

A first aspect pertains to a method for generating three-dimensional scan data of one or more areas of interest in an environment. Said method comprises a user defining the one or more areas of interest using a mobile device in the environment, and a scanning device performing a scanning procedure at each defined area of interest to generate the scan data of the respective area of interest. Defining the areas of interest comprises, for each area of interest, generating identification data, which at least comprises generating image data of the respective area of interest. The scanning procedure at each defined area of interest is performed by a mobile robot comprising the scanning device and being configured for autonomously performing a scan of a surrounding area using the scanning device, the mobile robot having a SLAM functionality for simultaneous localization and mapping and being configured to autonomously move through the environment using the SLAM functionality. The identification data is provided to the mobile robot, and, in the course of each scanning procedure, the mobile robot navigates to the respective area of interest using the identification data, detects the respective area of interest using the identification data, and uses the scanning device to scan the respective area of interest to generate the three-dimensional scan data.

According to some embodiments of the method, generating the identification data comprises generating position data related to a determined position of the mobile device at the respective area of interest. The position of the mobile device is determined relative to the environment, e.g. relative to a local coordinate system of the environment, and/or relative to a global coordinate system, e.g. using GNSS data of a global navigation satellite system receiver of the mobile device. For instance, the determined position can be a position of the mobile device while capturing the image data.

According to some embodiments of the method, generating the identification data comprises generating pose data related to a pose of the mobile device while capturing the image data—for instance using IMU data of an inertial measuring unit of the mobile device—the pose comprising at least the attitude in three degrees-of-freedom.

According to some embodiments of the method, the mobile device tracks its path in the environment, and generating the identification data comprises generating path data related to the path of the mobile device. For instance, navigating to the respective area of interest may comprise using the path data, and/or the mobile robot may generate, based on the path information, a route for the mobile robot through the environment.

In one embodiment, tracking the path comprises using a SLAM functionality of the mobile device. For instance, for tracking the path the SLAM functionality of the mobile device may use at least one of IMU data of an inertial measuring unit of the mobile device, and image data continuously captured by at least one camera of the mobile device.

According to some embodiments of the method, the identification data is generated using environment data comprising at least one of image data, 2D data or 3D data of the environment. For instance, the environment data may be retrieved from an external data source, and/or may be used for determining a position of an area of interest based on the image data. Optionally, the image data may comprise depth information.

According to some embodiments of the method, the mobile robot has access to environment data comprising 3D data of the environment, wherein the mobile robot

- moves through the environment using the environment data and its SLAM functionality;
- navigates to the respective area of interest using the identification data and the environment data; and/or
- detects the areas of interest based on the identification data and the environment data.

The 3D data of the environment in particular may have a lower resolution than the scan data of the areas of interest.

According to some embodiments of the method, the mobile device comprises a display, at least one camera and an image-capturing functionality for generating, upon a trigger by the user of the mobile device and using the at least one camera, the image data. Optionally, also position data and/or pose data may be generated upon the trigger.

According to some embodiments of the method, the identification data is generated and provided to the mobile robot directly after generating the image data.

According to some embodiments of the method, the mobile robot starts a scanning procedure upon receiving the identification data.

According to some embodiments of the method, the image data comprises depth information. For instance, the mobile device comprises at least one time-of-flight camera and/or a 3D camera arrangement. In one embodiment, the identification data is generated using environment data comprising 3D data of the environment, wherein the environment data is used for determining a position of an area of interest based on the depth information; in another embodiment, the mobile robot detects the respective area of interest based on the depth information, for instance wherein the mobile robot comprises at least one time-of-flight camera and/or a 3D camera arrangement.

A second aspect pertains to a system for generating three-dimensional scan data of one or more areas of interest in an environment, e.g. according to the method of the first aspect, the system comprising a mobile device and a mobile robot. The mobile device comprises a camera for capturing images of the one or more areas of interest and for generating image data, and the mobile robot has a SLAM functionality for simultaneous localization and mapping and a scanning device for performing a scan at the one or more areas of interest and generating the scan data of the one or more areas of interest. The system is configured to generate, using at least the image data, identification data for each of the one or more areas of interest, the identification data allowing identifying the respective area of interest, and to provide the identification data to the mobile robot. The mobile robot is configured to autonomously

- move through the environment using the SLAM functionality;
- navigate to the areas of interest using the identification data;
- detect the areas of interest based on the identification data; and
- perform a scan at each of the one or more areas of interest to generate the three-dimensional scan data.

In some embodiments of the system, the scanning device comprises at least one laser scanner. In some embodiments, the scanning device comprises at least one structured-light scanner. In some embodiments, the scanning device comprises at least one time-of-flight camera.

In some embodiments of the system, the mobile robot is configured as a legged robot, comprising actuated legs for moving through the environment. In some embodiments, the mobile robot is configured as a wheeled robot, comprising actuated wheels for moving through the environment. In some embodiments, the mobile robot is configured as an unmanned aerial vehicle, e.g. a quadcopter, comprising actuated rotors for moving through the environment.

According to some embodiments of the system, the mobile device comprises a display, at least one camera and an image-capturing functionality for generating the image data upon a trigger by the user of the mobile device and using the at least one camera. In one embodiment, the image-capturing functionality is provided by a software application installed on the mobile device, wherein the display is configured as a touchscreen and the software application allows the user to mark an area in an image displayed on the display to define as an area of interest. In one embodiment, the mobile device comprises an inertial measuring unit, a compass and/or a GNSS receiver. In one embodiment, the at least one camera is configured as a time-of-flight camera and the image data comprises depth information. In one embodiment, the mobile device is configured for detecting a position of the mobile device while capturing the image data, and the system is configured to generate the identification data using position data related to the detected position. In one embodiment, the mobile device is configured for detecting a pose of the mobile device while capturing the image data, and the system is configured to generate the identification data using pose data related to the detected pose. In one embodiment, the mobile device is configured for tracking a path through the environment, e.g. using a SLAM functionality of the mobile device, IMU data of an inertial measuring unit of the mobile device, and/or image data continuously captured by the at least one camera, and the system is configured to generate the identification data using path data related to the path.

According to some embodiments of the system, the mobile robot is configured to receive environment data comprising 3D data of the environment, and the mobile robot is configured to autonomously move through the environment using the environment data and the SLAM functionality, to navigate to the areas of interest using the environment data and the determined positions, and/or to detect the areas of interest based on the image data and the 3D data, for instance wherein the image data comprises depth information.

According to some embodiments of the system, the mobile device comprises a SLAM functionality for simultaneous localization and mapping of the mobile device and is configured to track the path using the SLAM functionality. Optionally, for tracking the path the SLAM functionality uses IMU data of an inertial measuring unit of the mobile device, and/or image data continuously captured by at least one camera of the mobile device.

BRIEF DESCRIPTION OF THE DRAWINGS

The disclosure in the following will be described in detail by referring to exemplary embodiments that are accompanied by figures, in which.

DETAILED DESCRIPTION

Figure 1:
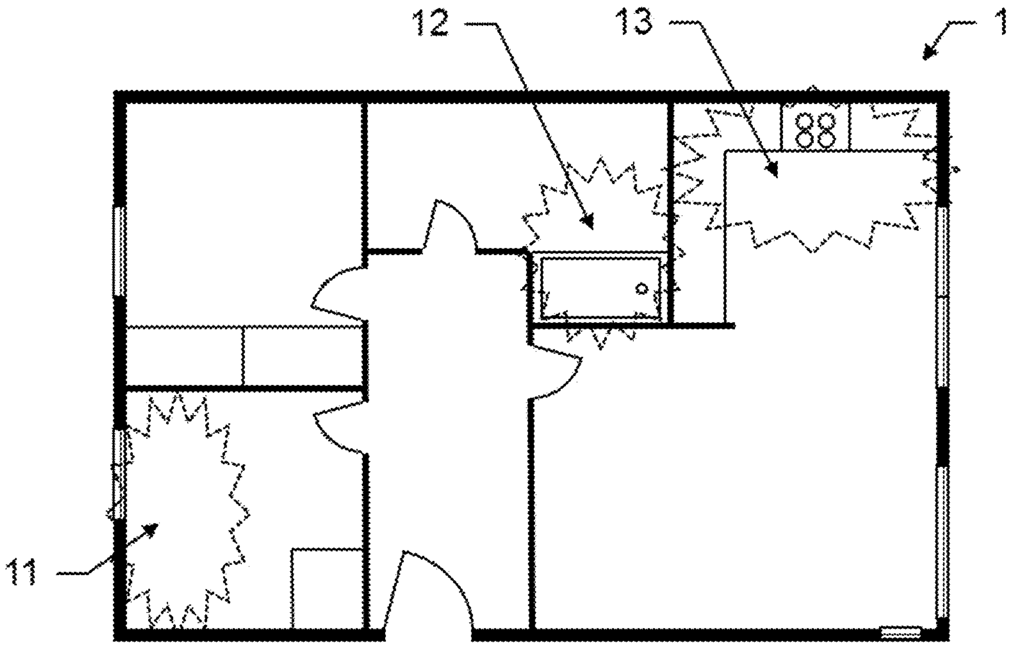
FIG. 1 shows an exemplary environment with three areas of interest that a user wants to be scanned.

FIG. 1 shows a layout of an apartment. The apartment is an example of an environment 1, in which there are areas of interest that a person would like to have scanned. In the shown example, there are three areas of interest 11, 12, 13. A first area of interest 11 is situated in a bedroom and comprises a wall including a window. A second area of interest 12 is situated in a bathroom and comprises appliances including a bathtub. A third area of interest 11 is situated in a combined kitchen and living room and comprises a built-in kitchen unit including a stove.

For instance, the window, the bathtub and the kitchen unit have recently been installed in the apartment, and an existing 3D model of the apartment needs to be updated with new 3D data of these areas. In this case, for instance, the person who would like to have the scans performed at the areas of interest may be a contractor or craftsman that have installed the applications or an owner of the apartment or an architect that have commissioned the installations. Alternatively, there is no 3D model of the environment 1, and only 3D data of the areas of interest 11, 12, 13 may be needed.

Conventionally, the person who would like to have the scans performed would haul a scanner through the apartment and place it at each area of interest to perform the scans. Alternatively, the person could define the areas of interest and then have someone else perform the scanning.

In the approach suggested by the present application, the areas of interest are specifically defined by a user of a mobile device. Data comprising identification information that allows identifying the defined areas is made available to a mobile robot that will perform the scans.

Figure 2:
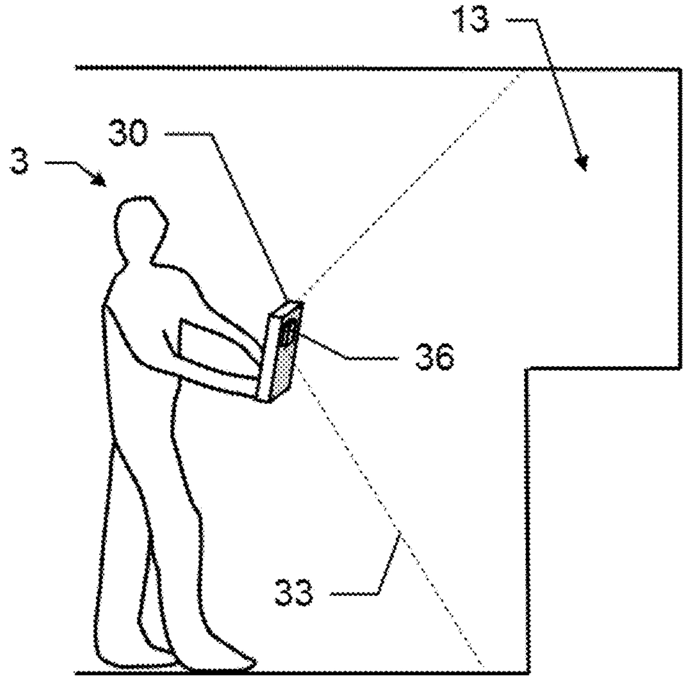
FIG. 2 shows the user defining an area of interest by capturing image data thereof using a mobile device.

FIG. 2 shows the user 3 of an exemplary embodiment of the mobile device 30 at the third area of interest 13 of the environment of FIG. 1. The mobile device 30 has a camera 36 and is used by the user 3 to capture an image 33 of the area of interest 13.

Figure 3:
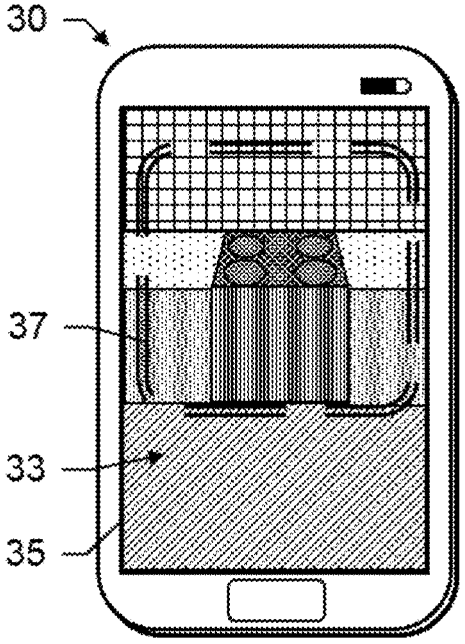
FIG. 3 shows an exemplary of the mobile device.

FIG. 3 shows the front side of the mobile device 30 of FIG. 2. It comprises a display 35 and an image capturing functionality to capture images 33 of the areas of interest, thereby generating digital image data that may be provided to the mobile robot. The image may be captured upon receiving a trigger by the user. For instance, the trigger may comprise the user pushing a button of the mobile device or a digital button on the touch-sensitive display 35. Also a position of the mobile device may be determined and position data may be generated upon receiving the trigger. The identification data to be provided to the mobile robot may comprise the image data and the position data or be generated based on the image data and the position data.

Optionally, the user may define an area 37 in the image (e.g. using the touch-sensitive display 35) as the area of interest. Then, for instance, this information is included in the identification data. Alternatively, only the image data related to the user-defined area 37 in the image is included in generating the identification data.

The identification data needs to include data that allows the mobile robot to determine at least a rough position of each area of interest within the environment 1. For instance, an absolute or relative position of the mobile device may be determined while capturing the image or a path to that position may be tracked. The identification data further needs to include data that allows the mobile robot to detect the area of interest at this rough position. In particular, this information may include the image data of the area of interest and/or pose data regarding a pose of the mobile device while capturing the image data. Alternatively, a precise position of the area of interest may be derived by comparing the image data and existing environment data.

Figure 4:
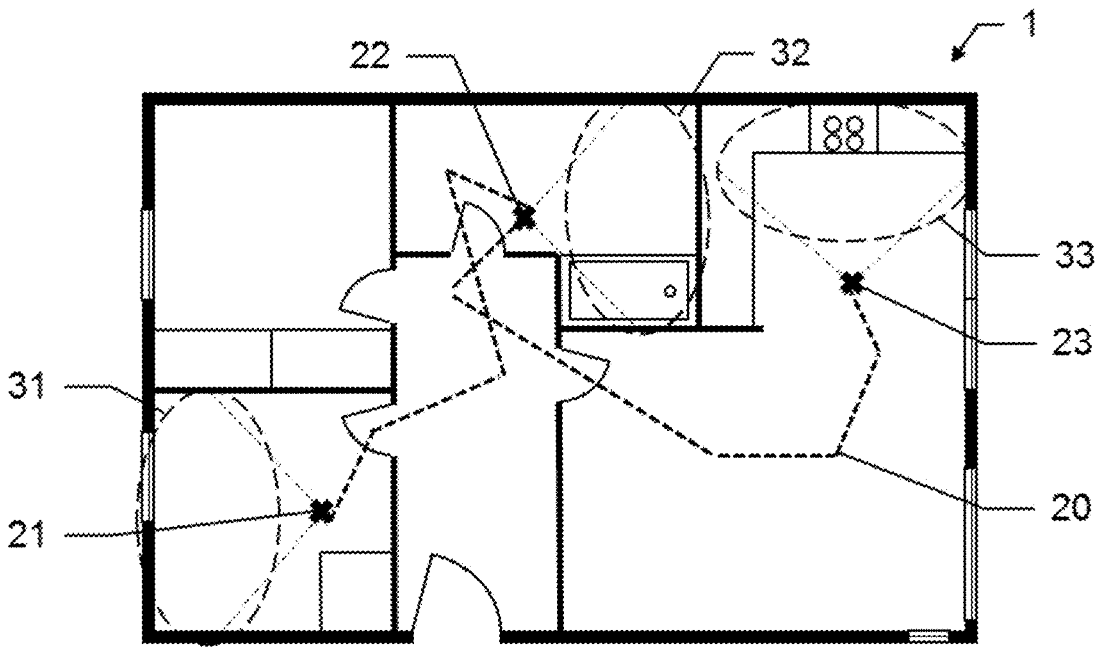
FIG. 4 shows a path of the user through the environment to capture image data of each of the three areas of interest.

FIG. 4 shows an exemplary path of the user of the mobile device through the environment 1. The user captures a first image 31 of the first area of interest from a first position 21, then moves along a path 20 to a second position 22 to capture an image 32 of the second area of interest and finally moves along the path 20 to a third position 23 to capture an image 33 of the third area of interest.

While the user moves along the path 20, the mobile device may track this path and generate path information. For instance, tracking the path 20 may involve using one or more cameras and/or an inertial measuring unit (IMU) and a simultaneous localization and mapping (SLAM) functionality of the mobile device. Also, the mobile device may comprise a compass and/or a global navigation satellite system (GNSS) receiver that may be involved in tracking the path 20. The path information may be part of the identification data or used to generate the identification data for an area of interest, particularly path information relating to the path 20 from the previous area of interest.

The identification data of each area of interest may be generated and sent to the mobile robot directly after capturing the respective image. Alternatively, generating and/or sending the identification data may require a further user input, e.g. on the mobile device.

Figure 5:
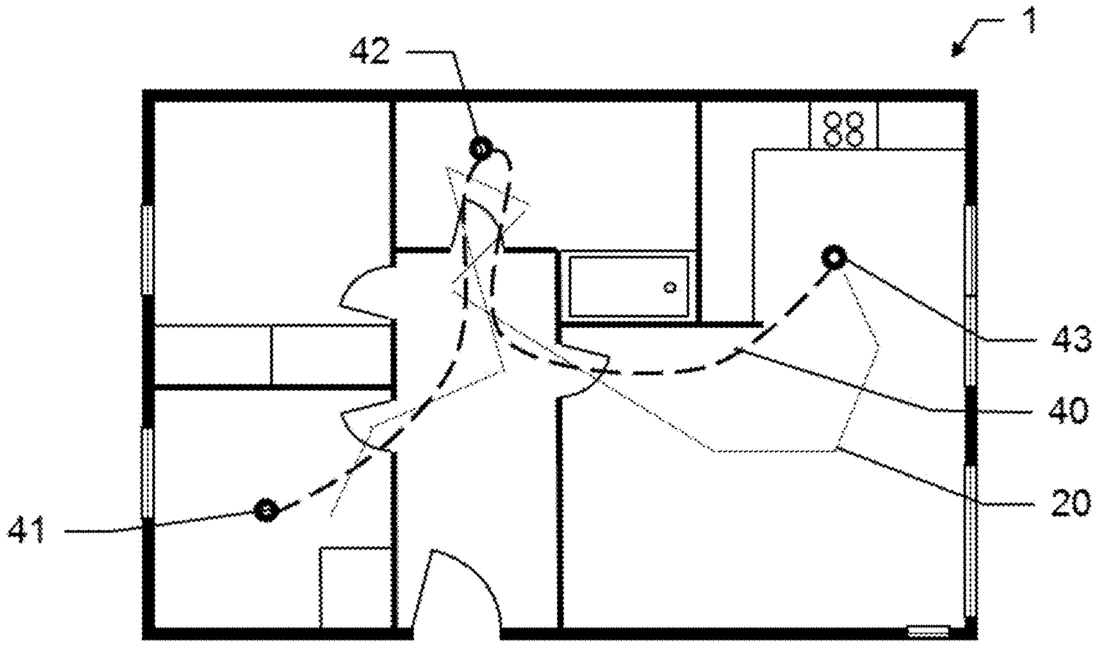
FIG. 5 shows a path of a mobile robot through the environment to scan each of the three areas of interest.

FIG. 5 shows the scanning by the mobile robot 2 in the environment 1. The mobile robot 2 has a SLAM functionality for simultaneous localization and mapping that allows the mobile robot to autonomously move through the environment 1. The mobile robot uses the received identification data to autonomously navigate to the user-defined areas of interest.

In the shown example, having received the identification data of the three areas of interest, the mobile robot moves to a first scanning position 41 at the first area of interest and performs a first scan. Then, the mobile robot moves along a path 40 to a second scanning position 42 and to a third scanning position to perform a second and third scan.

The scanning positions are selected based on the received identification data. It is not necessary that the scanning position is the same as the position at which the image of the respective area of interest has been captured. Sometimes, it may be even necessary to use a different position for the scanning than for capturing the image.

By also using the information of the user's path 20, the robot can quickly navigate between interest points, as the planning required basically consists only of local obstacle avoidance. Furthermore, because of the user's selections, the robot is aware of what is important and does not spend time on places in which the user is not interested. Hence, the time-efficiency of the robot is also increased and can approach that of a teach-and-repeat workflow (where the "planning" is entirely up to the operator).

Another possibility is that if an environment model, e.g. a CAD model of the environment, is available, the robot can try to localize itself with respect to this model and do the same operations as if the CAD model was a previously recorded scan.

Figure 6:
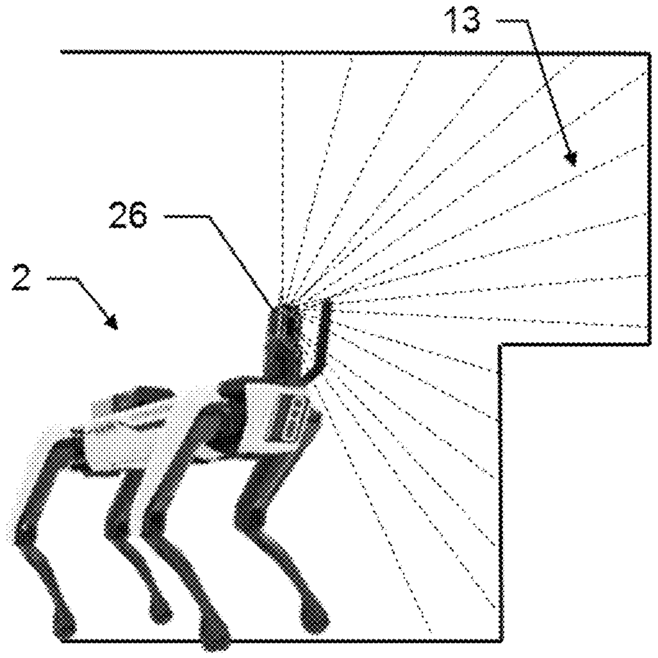
FIG. 6 shows the mobile robot scanning the defined area of interest of FIG. 2.

FIG. 6 shows an exemplary embodiment of the mobile robot 2 at the third area of interest 13 of the environment of FIG. 1. The mobile robot has a scanning device 26 to capture the 3D data of the area of interest 13.

For moving through the environment, the mobile robot may use different kinds of locomotion, each having its own advantages and disadvantages depending on the kind of environment. For instance, as shown here, the mobile robot 2 may be embodied as a legged robot, e.g. comprising four actuated legs. Alternatively, the robot 2 may be configured as a wheeled robot, i.e. comprising actuated wheels (and/or tracks), or as an unmanned aerial vehicle (UAV), particularly a quadcopter comprising actuated rotors.

The scanning device 26 of the mobile robot may comprise any suitable scanning means, in particular at least one laser scanner, at least one structured-light scanner, and/or at least one time-of-flight camera.

Figure 7:
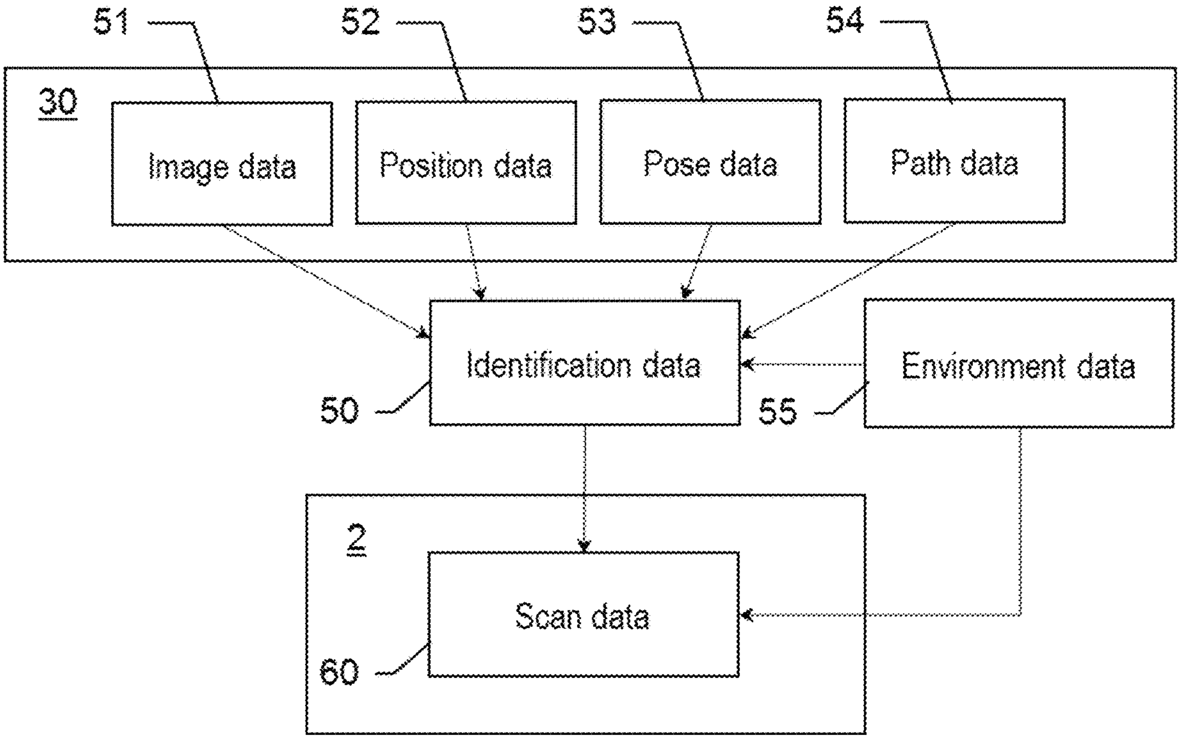
FIG. 7 illustrates the data generated and used during an exemplary embodiment of a method.

FIG. 7 illustrates the generation, use and flow of data within an exemplary embodiment of a system while performing an exemplary embodiment of a method. The mobile device 30 captures image data 51 of the area of interest and optionally further data, such as position data 52 and pose data 53 related to a position and pose of the device 30 while capturing the image data 51. The mobile device 30 may also generate path data 54 from tracking a path to the area of interest. Also, the image data 51 may comprise RGB and depth information.

This data 51, 52, 53, 54 captured by the mobile device 30 is used to generate identification data 50 that will be provided to the mobile robot 2. Generating the identification data 50 may be done on the mobile device 30 or on an external computing unit of the system. It may comprise using existing environment data 55 of the environment. This may comprise 2D, 3D or image data of the environment.

The mobile robot 2 receives the identification data 50, identifies the area of interest and generates the scan data 60 of the area of interest. For facilitating identification of the area of interest, the mobile robot optionally may use existing environment data 55 of the environment.

Figure 8:
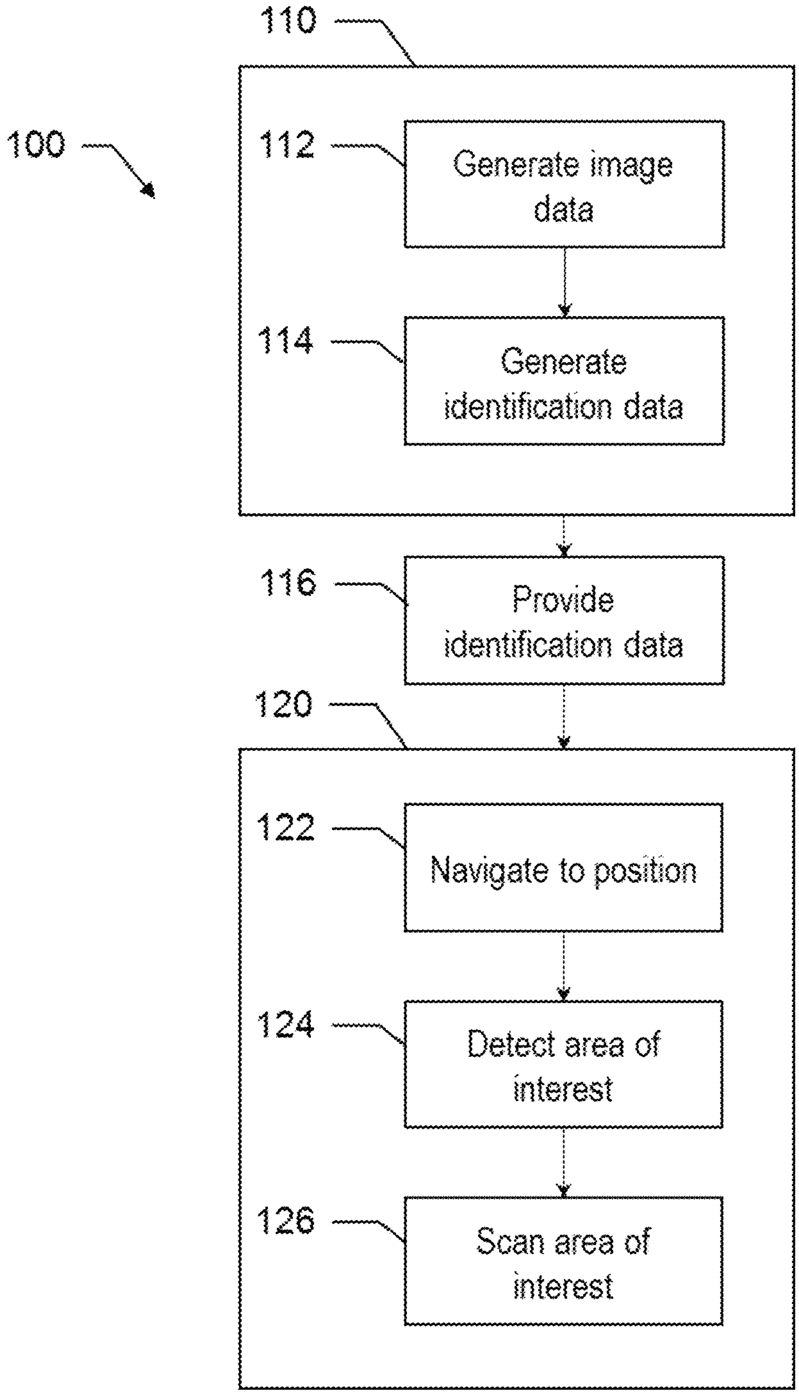
FIG. 8 shows a flowchart illustrating an exemplary embodiment of a method.

FIG. 8 shows a flow chart illustrating an exemplary embodiment of a method 100. The approach of the described method 100 allows to efficiently operate and not spend time on areas that are not of particular interest. Also, it includes the advantage of a teach-and-repeat workflow which allows the robot to quickly navigate as it has a strong prior on the path it can take (i.e. the user's trajectory). The approach can be seen as a sort of a teach-and-repeat workflow with additional information added, namely the areas of interest defined by the user. Therefore, it can be placed between a fully autonomous exploration and a simple path following algorithm.

As shown here, the approach consists of two stages. In a first stage (definition stage 110), a user, using a mobile device, takes images of areas of interest, e.g. those places that should be scanned thoroughly. The mobile device captures the images, thus generating 112 image data of the areas of interest. Optionally, the mobile device also captures other data, e.g. regarding a position or pose of the device while capturing the image. For instance, the device may record the user's motion by means of an odometry system (e.g. ARKit, ARCore) to determine a trajectory between two areas of interest. Based on the image data and the other data, identification data is generated 114 and provided 116 to the mobile robot.

In a second stage (scanning stage 120), the mobile robot identifies the areas of interest based on the images taken by the user and references itself relative to the position of the mobile device when taking the image.

The scanning stage 120 comprises the robot using the identification data 50 to autonomously navigate 122 towards the respective area of interest and to detect 124 the respective area of interest. Optionally, in order to efficiently navigate between the areas of interest, the robot may use the user's trajectory as a basis for its own path planning. Then, the robot uses its scanning device to scan 126 the area of interest to generate the three-dimensional scan data.

During the first stage 110, the user can use a large variety of lightweight devices (almost any modern smartphone/tablet), which allows to quickly go through the scene and select (define) the areas of interest. A software application ("app") may be installed on the mobile device that automatically provides the captured data (or identification data that is generated based on the captured data) to the mobile robot—either directly or via a server computer. The app may also automatically track the user's movement between two areas of interest. Optionally, the app may also receive a user input, e.g. on a touchscreen of the mobile device, to define the area of interest more precisely in the captured image.

Furthermore, in order to do this, the robot performing the scanning does not need to be on-sight at the time of capturing the data. Hence, one can make efficient use of resources, e.g. the expert can visit multiple sites in a short time and is not bound to having the infrastructure (i.e. the robot) in place at the time of his visit.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A method for generating three-dimensional scan data of one or more areas of interest in an environment using a mobile robot, wherein the mobile robot comprises actuated legs or wheels for moving through the environment and has a SLAM functionality for simultaneous localization and mapping, comprises a scanning device, and is configured to autonomously move through the environment using the SLAM functionality and to autonomously perform a scan of a surrounding area using the scanning device, the scanning device comprising at least one of a laser scanner, a structured-light scanner, and a time-of-flight camera, the method comprising:

a user defining the one or more areas of interest, wherein defining an area of interest comprises the user, while being positioned in the environment, using a mobile device to generate identification data, wherein the mobile device comprises at least one camera, and the identification data at least comprises image data of the respective area of interest generated by the at least one camera;

providing the identification data to the mobile robot; and the mobile robot performing a scanning procedure at each defined area of interest to generate the scan data of the respective area of interest, wherein, in the course of each scanning procedure, the mobile robot:

navigates to the respective area of interest using the identification data;

detects the respective area of interest using the identification data; and uses the scanning device to scan the respective area of interest to generate the three-dimensional scan data.

2. The method according to claim 1, wherein generating the identification data comprises generating position data related to a determined position of the mobile device at the respective area of interest, wherein the position is a position of the mobile device while capturing the image data, wherein the position of the mobile device is determined:

relative to the environment, and/or relative to a global coordinate system.

3. The method according to claim 1, wherein generating the identification data comprises generating pose data related to a pose of the mobile device while capturing the image data, the pose comprising at least the attitude in three degrees-of-freedom.

4. The method according to claim 1, wherein the mobile device tracks its path in the environment and the identification data comprises path data related to the path of the mobile device, wherein:

navigating to the respective area of interest comprises using the path data; and/or the mobile robot generates, based on the path information, a route for the mobile robot through the environment.

5. The method according to claim 4, wherein tracking the path comprises using a SLAM functionality of the mobile device, wherein for tracking the path the SLAM functionality of the mobile device uses at least one of:

IMU data of an inertial measuring unit of the mobile device, and image data continuously captured by at least one camera of the mobile device.

6. The method according to claim 1, wherein the identification data is generated using environment data comprising at least one of image data, 2D data or 3D data of the environment.

7. The method according to claim 6, wherein the environment data is retrieved from an external data source.

8. The method according to claim 6, wherein the environment data is used for determining a position of an area of interest based on depth information comprised by the image data.

9. The method according to claim 1, wherein the mobile robot has access to environment data comprising 3D data of the environment, wherein the mobile robot:

moves through the environment using the environment data and its SLAM functionality;

navigates to the respective area of interest using the identification data and the environment data; and/or detects the areas of interest based on the identification data and the environment data, wherein the 3D data of the environment has a lower resolution than the scan data of the areas of interest.

10. The method according to claim 1, wherein the mobile device comprises a display and an image-capturing functionality for generating, upon a trigger by the user of the mobile device and using the at least one camera, the image data, wherein also position data and/or pose data is generated upon the trigger.

11. The method according to claim 1, wherein:

the identification data is generated and provided to the mobile robot directly after generating the image data; and/or the mobile robot starts a scanning procedure upon receiving the identification data.

12. The method according to claim 1, wherein the image data comprises depth information.

13. The method according to claim 1, wherein the mobile device is a smartphone or a tablet comprising a touchscreen, wherein the user uses the touchscreen to define the one or more areas of interest and/or to initiate generating the identification data.

14. A system for generating three-dimensional scan data of one or more areas of interest in an environment, the system comprising a mobile device and a mobile robot, wherein:

the mobile device comprises a display and at least one camera for capturing images of the one or more areas of interest and for generating image data, the mobile device being configured to receive a trigger from a user holding the mobile device and having an image-capturing functionality for generating the image data upon receiving the trigger, the mobile robot is configured as a legged robot comprising actuated legs for moving through the environment, or as a wheeled robot comprising actuated wheels for moving through the environment, and the mobile robot has a SLAM functionality for simultaneous localization and mapping and a scanning device for performing a scan at the one or more areas of interest and generating the scan data of the one or more areas of interest, wherein the scanning device comprises at least one of a laser scanner, a structured-light scanner, and a time-of-flight camera;

wherein the system is configured to generate, using at least the image data, identification data for each of the one or more areas of interest, the identification data allowing identifying the respective area of interest, and to provide the identification data to the mobile robot, wherein the mobile robot is configured to autonomously:

move through the environment using the SLAM functionality;

navigate to the areas of interest using the identification data;

detect the areas of interest based on the identification data; and perform a scan at each of the one or more areas of interest to generate the three-dimensional scan data.

15. The system according to claim 14, wherein:

the image-capturing functionality is provided by a software application installed on the mobile device, wherein the display is configured as a touchscreen and the software application allows the user to mark an area in an image displayed on the display to define as an area of interest;

the mobile device comprises an inertial measuring unit, a compass and/or a GNSS receiver;

the at least one camera is configured as a time-of-flight camera and the image data comprises depth information;

the mobile device is configured for detecting a position of the mobile device while capturing the image data, and the system is configured to generate the identification data using position data related to the detected position;

the mobile device is configured for detecting a pose of the mobile device while capturing the image data, and the system is configured to generate the identification data using pose data related to the detected pose; and/or the mobile device is configured for tracking a path through the environment, and the system is configured to generate the identification data using path data related to the path.

16. The system according to claim 14, wherein the mobile robot is configured to receive environment data comprising 3D data of the environment, and is configured to autonomously:

move through the environment using the environment data and the SLAM functionality;

navigate to the areas of interest using the environment data and the determined positions; and/or detect the areas of interest based on the image data and the 3D data.

17. The system according to claim 14, wherein the mobile device comprises a SLAM functionality for simultaneous localization and mapping of the mobile device and is configured to track the path using the SLAM functionality, wherein for tracking the path the SLAM functionality uses:

IMU data of an inertial measuring unit of the mobile device, and/or image data continuously captured by at least one camera of the mobile device.

18. A method for generating three-dimensional scan data of one or more areas of interest in an environment using a mobile robot, wherein the mobile robot has a SLAM functionality for simultaneous localization and mapping, comprises a scanning device, and is configured to autonomously move through the environment using the SLAM functionality and to autonomously perform a scan of a surrounding area using the scanning device, the scanning device comprising at least one of a laser scanner, a structured-light scanner, and a time-of-flight camera, the method comprising:

a user defining the one or more areas of interest, wherein defining an area of interest comprises the user, while being positioned in the environment, using a mobile device to generate identification data, wherein the mobile device comprises at least one of a time-of-flight camera and a 3D camera arrangement, and the identification data is generated using image data and depth information of the respective area of interest, the image data and the depth information being generated by the time-of-flight camera or the 3D camera arrangement, respectively;

providing the identification data to the mobile robot; and the mobile robot performing a scanning procedure at each defined area of interest to generate the scan data of the respective area of interest, wherein, in the course of each scanning procedure, the mobile robot:

navigates to the respective area of interest using the identification data;

detects the respective area of interest using the identification data; and uses the scanning device to scan the respective area of interest to generate the three-dimensional scan data.

19. The method according to claim 18, wherein a position of an area of interest is determined based on the depth information.

20. The method according to claim 18, wherein the mobile robot comprises at least one of a time-of-flight camera and a 3D camera arrangement and detects the respective area of interest based on the depth information.

* * * * *